United States Patent [19]

Balson

[11] 4,217,614
[45] Aug. 12, 1980

[54] CASSETTE TAPE POSITION INDICATOR

[76] Inventor: Nicholas Balson, 6/29 Diamond Bay Rd., Vaucluse, New South Walles, Australia, 2030

[21] Appl. No.: 6,157

[22] Filed: Jan. 24, 1979

[30] Foreign Application Priority Data

Feb. 14, 1978 [AU] Australia .............................. PD3369

[51] Int. Cl.² .............................................. G11B 23/08
[52] U.S. Cl. .................................... 360/132; 116/284
[58] Field of Search ................ 360/132; 116/284, 309, 116/318

[56] References Cited

U.S. PATENT DOCUMENTS

| | | | |
|---|---|---|---|
| 3,623,450 | 11/1971 | Siller | 360/132 |
| 3,630,170 | 12/1971 | Christo | 360/132 |
| 3,913,200 | 10/1975 | Kossor | 116/284 |

FOREIGN PATENT DOCUMENTS 2151514  4/1972  Fed. Rep. of Germany ........... 360/132

Primary Examiner—Robert S. Tupper
Attorney, Agent, or Firm—Ladas & Parry

[57] ABSTRACT

A tape position indicator embodied in a cassette of the type that incorporates a casing which houses a pair of spools and a magnetic tape extending between the spools. The indicator is associated with at least one of the spools and it incorporates at least one indicia carrying element that moves through a portion of a revolution in response to a predetermined number of revolutions being made by the associated spool during transport of the tape from one of the spools to the other. The indicia carried by the element is displayed through a window in one or the other or both sides of the cassette casing and hence provides for an indication of the number of revolutions made by the cassette spools.

6 Claims, 9 Drawing Figures

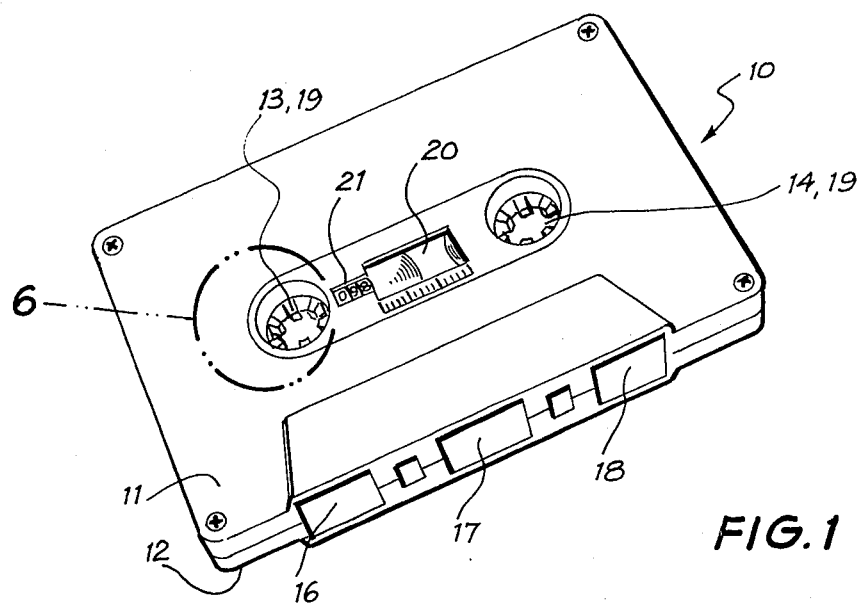
FIG. 1
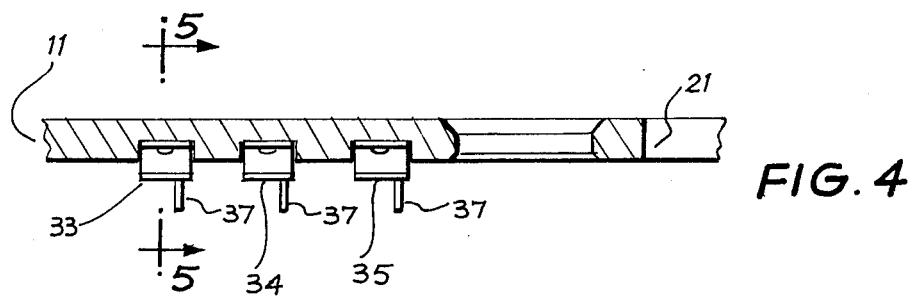
FIG. 4
FIG. 5
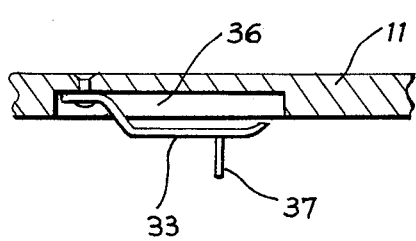
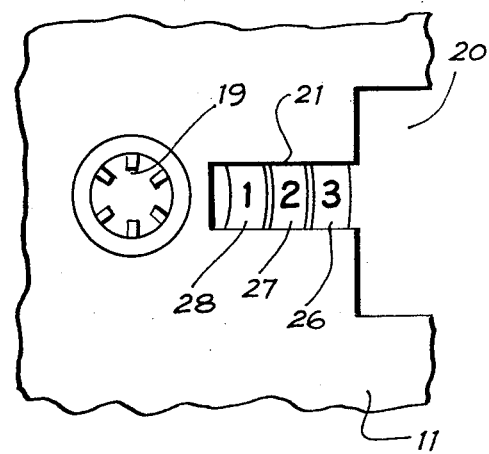
FIG. 6

CASSETTE TAPE POSITION INDICATOR

FIELD OF THE INVENTION

This invention relates to a tape position indicator for a cassette of the type comprising a casing which houses a pair of spools and a magnetic tape extending between the spools.

The expression "tape position" or "position of the tape" as employed herein is to be understood to mean the position of a notional point on the tape relative to the spool from which or to which the tape is being wound. Stated in other words, the present invention provides means for determining the amount of tape that has been transferred from one spool to the other.

BACKGROUND OF THE INVENTION

A cassette of the type with which the present invention is concerned usually includes a window within the casing so that one may perceive how much tape is on one or the other of the tape spools and hence obtain an approximate indication of the commencement position of a selected passage that is recorded on the tape. However, when a large number of separate passages are recorded on the tape, with each passage occupying only a small portion of the length of the tape, it is difficult to locate the commencement of any one passage by simply viewing the tape through the window.

Spindle driven counters of the type used in most reel-to-reel tape recorders may be, and frequently are, employed in conjunction with cassette recorders, but such counter arrangements relate to the spindle revolutions and hence relate in an indirect way only to the tape position relative to one of the spools. This means that, if a first cassette is removed from a recorder before the tape has been completely transported from one spool to the other and the recorder is subsequently used with other cassettes, when the first cassette is returned to the recorder it is most unlikely that a true indication will be given, by the counter, as to the position of the tape in the returned cassette. Then, to enable location of a desired position on the tape, the tape must be wound back to its starting position and the counter must be set to zero. Similarly, if a cassette is removed from a recorder before one "side" is completely played out and the cassette is inverted and reinserted in the recorder for the purpose of playing the second "side", then the count shown by the spindle driven counter will be inappropriate to the second side and, to enable location of a particular passage on the second side, the tape would have to be wound back to its starting position and the counter be set to zero. This may be found to be inconvenient in certain circumstances and, in any case, it is thought that it is desirable to provide means within the cassette itself for giving indication as to the position of the tape relative to the spools.

OBJECT OF THE INVENTION

The present invention has for its object to provide a tape position indicator in or otherwise associated with a cassette casing so that an indication may be given as to the position of the tape before and, desirably, after the cassette is loaded into a recorder, whereby the tape may be wound directly from an existing position to any selected position. To permit selection of a desired position, an index may be provided or be produced which relates the position indicated by the indicator to the commencement of the various passages on the tape.

SUMMARY OF THE INVENTION

Broadly defined, the present invention provides a tape cassette comprising a casing, a pair of spools housed within the casing, a magnetic tape extending between the spools, and an indicator for giving indication as to the position of the tape within the casing. The tape indicator comprises indicia carrying means associated with at least one of the spools and means within the casing which permits viewing of the indicia. The indicia carrying means is arranged to be moved in response to a predetermined number of revolutions being made by the associated spool during transport of the tape from one of the spools to the other.

Indicia revealed by said carrying means provides an indication as to the position of the tape within the casing as a result of the indicia carrying means being moved as the spools rotate, due to the magnetic tape being transported through the casing and being moved from one spool to the other. Thus, in operation of the tape position indicator, the indicia increments as the magnetic tape is being transferred from one spool to the other.

PREFERRED FEATURES OF THE INVENTION

In accordance with a preferred aspect of the present invention, the indicia carrying means comprises a series of indicator elements, one of which is turned through a portion of one revolution with each revolution of the associated spool and respective others of which are turned through a portion of a revolution with higher order numbers or revolutions being made by the spool. For example, there may be three indicator elements, one of which increments with each revolution of the spool, the second of which increments with each ten revolutions of the spool, and the third of which increments each one-hundred revolutions of the spool. An increment corresponds with a portion of a revolution made by the respective elements, and the elements may increment upwardly and downwardly depending upon the direction of rotation of the associated spool.

The indicia would normally comprise numerals, so that, with a three-element indicia carrying means, one would see such displays as, for example, 0-0-5 or 0-1-3 or 9-9-9. However, other indicia such as colour codes or alpha codes or alpha-numeric codes might alternatively be employed.

The invention will be more fully understood from the following description of examplary embodiments of the invention, the description being given with reference to the accompanying drawings.

BRIEF DESCRIPTION OF THE DRAWINGS

FIG. 1 shows a perspective view of a cassette which includes a two-part casing;

FIG. 4 shows, also on an enlarged scale, a scrap-sectional elevation view of one of the parts of the cassette casing, the view being taken along section plane 4—4 of FIG. 2;

FIG. 5 shows a scrap-sectional elevation view of the same part of the casing as shown in FIG. 4, but in the direction indicated by section plane 5—5 of the FIG. 4;

FIG. 6 shows an enlarged view of the portion of the cassette which is shown encircled by the ring 6 in FIG. 1;

DETAILED DESCRIPTION OF THE INVENTION

Figures 2, 3:
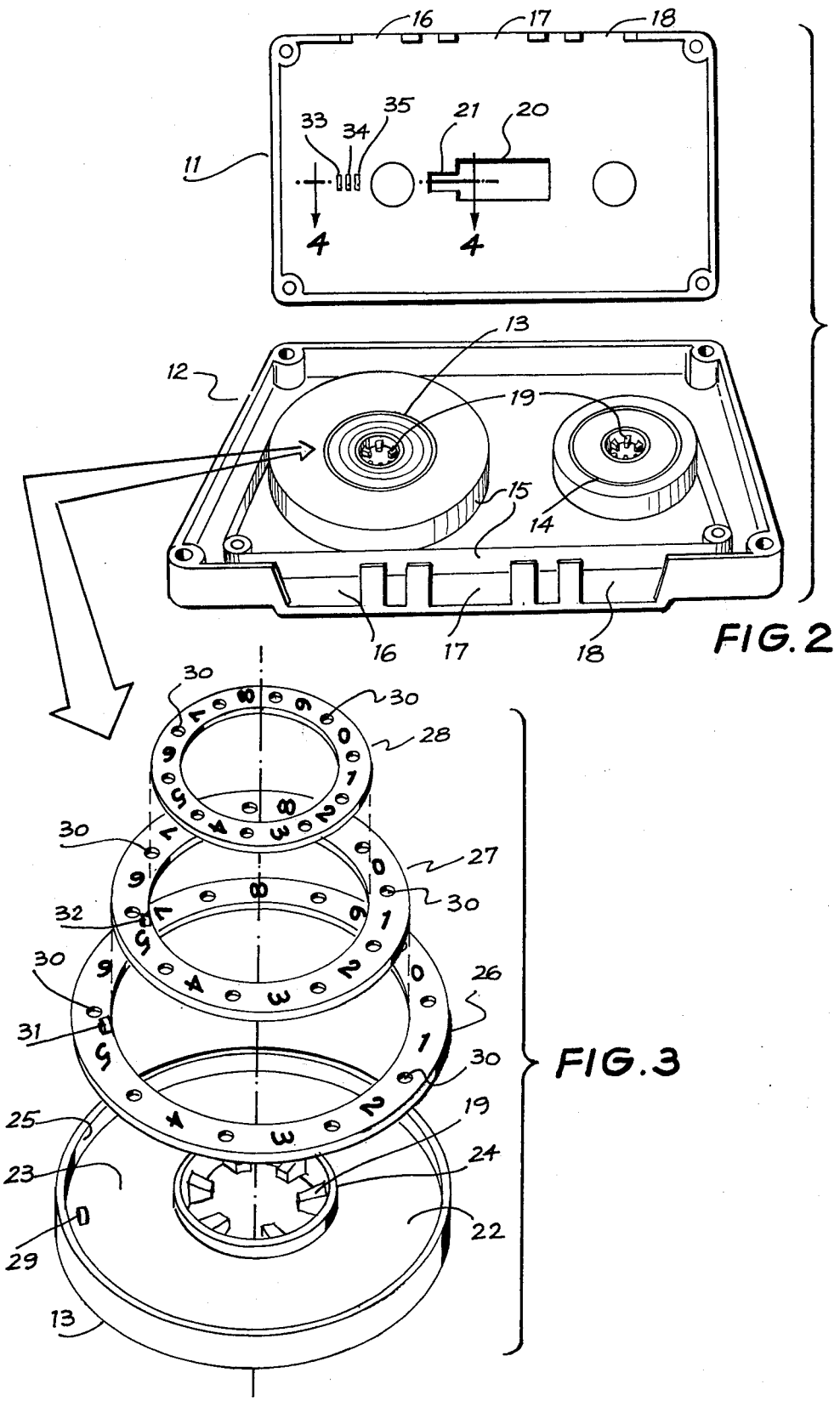
FIG. 2 shows a perspective view of the cassette with the two parts of the casing separated so as to reveal the interior of both parts.
FIG. 3 shows, on an enlarged scale, an exploded perspective view of one of the spools of the cassette, the Figure revealing three indicia-carrying indicator elements of a tape position indicator of the cassette.

The tape position indicator in accordance with the present invention is incorporated within a substantially conventional form of cassette assembly, as shown in FIG. 1 of the drawings. Such cassette comprises a two-part casing 10 which is composed of two interconnected casing parts 11 and 12. The casing houses first and second spools 13 and 14 between which a magnetic tape 15 is spooled, and openings 16, 17 and 18 are provided in a front edge of the casing. The openings are provided to permit contact between the tape 15 and a transport mechanism when the cassette is loaded into a recording or play-back device (herein referred to simply as a play-back device for convenience of reference) and to permit passage of the tape past a recording and/or play-back head of the device. Both of the tape spools 13 and 14 are rotatably mounted to the casing part 12 and they are formed in the usual way with internal flutes 19 for engagement with splined spindles (not shown) associated with the play-back device to which the cassette is, in use, mounted. A window 20 is provided in each part of the casing to permit visual inspection of the amount of tape on one or the other (or both) of the spools 13 and 14, and, in accordance with the present invention, a further window 21, which may simply comprise an extension of the main window 20, is provided in one or both of the casing parts 11 and 12.

The cassette which has been described thus far is used in the conventional way by loading it into a play-back device with all of the tape on one spool, say spool 13, or with a portion of the tape on both of the spools 13 and 14. The tape is then "played" until it is transported entirely to spool 14, at which time the cassette is removed from the play-back device and inverted so that the tape then winds from spool 14 to spool 13. Thus, the cassette may be regarded as having two "sides", Side A and Side B. Side A is shown uppermost in FIG. 1 and applies to tape transport from spool 13 to spool 14. Side B may comprise a mirror image of Side A or it may be arranged as an inversion of Side A, relative to the positioning of the window 21.

The present invention as below described provides for a more accurate indication as to the position of the tape 15 than can be obtained from conventional cassettes by simply viewing the amount of tape on the spools through the window 20. The invention is applicable to Sides A and/or B of the cassette but, for convenience, it is described as follows only in the context of Side A. For this purpose, spool 14 is of a conventional construction but spool 13 has a modified form.

As shown in FIG. 3, spool 13 is formed in one face with an annular channel 22 which is defined by a base 23, an inner wall 24 and a peripheral wall 25. The channel is occupied by three concentric apertured disc-like indicator elements 26, 27 and 28 and, lying outside the largest of the indicator elements is a nib 29. The nib is formed as an integral projection of the spool and is located within the channel 22.

Each of the indicator elements 26 to 28 is marked in a clockwise direction with the numerals 0 to 9, and located midway between consecutive numerals of each of the indicator elements is a small locator pin receiving aperture 30. Also, two of the indicator elements 26 and 27 are formed with upwardly projecting nibs 31 and 32 which are similar to the nib 29 in the channel 22. For a reason that will be come clearer later in the text of this specification, the nibs 29, 31 and 32 may be regarded as contact breaker elements.

Although the indicator elements are mounted to the spool 13 they are normally prevented from rotating with the spool. Thus, as described below, the indicator elements 26 to 28 are allowed to turn only to the extent that the numerals on the respective elements are progressively incremented with successive rotations of the spool 13, and for this purpose numerals appearing on the element 26 may be regarded as units, those on the element 27 as tens and those on the element 28 as hundreds. A typical display of the numerals is shown in FIG. 6 which illustrates a display as seen through the window 21. To assist in viewing, the window 21 may incorporate a magnifying lens.

Control over turning of the indicator elements 26 to 28 is exercised by contactors 33, 34 and 35 which are incorporated within the face of the cassette casing part 11 which confronts the spool groove 22. Each of the contactors comprises a leaf spring which is located within a recess 36 in the casing part 11 and the leaf spring is biassed in a direction towards the spool 13. A locator pin 37 projects outwardly from each of the contactors and is positioned to locate within the apertures 30 in the respective indicator elements 26 to 28. By locating within the relevant apertures 30 of the indicator elements 26 to 28, the locator pins 37 normally prevent turning of the indicator elements relative to the spool 13. However, the contactors 33, 34 and 35 are so positioned as to be engaged periodically by the nibs 29, 31 and 32 respectively, whereby the contactors are moved in a direction away from the spool 13, so that the locator pins 37 temporarily move from engagement with the apertures 30.

A description is now given in respect of the operation of the above described arrangement, it being assumed to start with that all of the tape is on spool 13 and the number revealed through window 21 is 0-0-0. Then, as the tape is transported from spool 13 to spool 14, when spool 13 reaches the end of its first revolution the nib 29 will engage the contactor 33 and cause the pin 37 to release from the hole in which it was located. Then, the indicator element 26 will be carried through a part of a revolution by the spool 13 (the other indicator elements 27 and 28 being still held non-rotatable relative to the spool), until such time as the nib 29 moves past the contactor 33 to let the pin 37 locate in the next aperture 30. Thus, the indicator element 26 increments by one numeral at the end of each revolution of the spool 13.

When the spool 13 is completing its ninth revolution, the nib 31 on the indicator element 26 engages with the contactor 34. This then causes the associated pin 37 to lift from its aperture in the element 27 and permits turning of the element 27 with the spool 13. This occurs with each successive complete revolution of the element 26 or, in other words, the element 27 increments by one numeral with every ten revolutions of the spool 13.

Similarly, at the end of each complete revolution of the element 27, the nib 32 on that element engages with the contactor 35 to permit incrementation of the element 28. In this way, element 28 increments by one numeral for every one-hundred revolutions of the spool 13.

The indicator elements 26 to 28 are composed of a plastics material and they are dimensioned and arranged so that, individually, the indicator elements will rotate with the spool immediately they are released by the associated pins 37 and only until such time as they are re-engaged by the pins 37.

Figure 7:
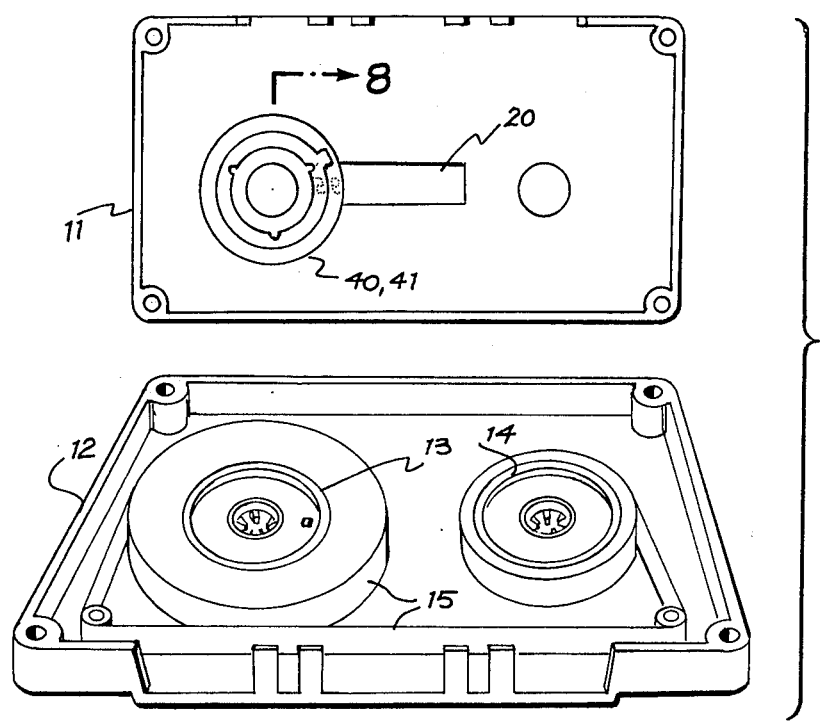
FIG. 7 shows a view which is similar to FIG. 2 but which reveals aspects of a second embodiment of the invention.
Figure 8:
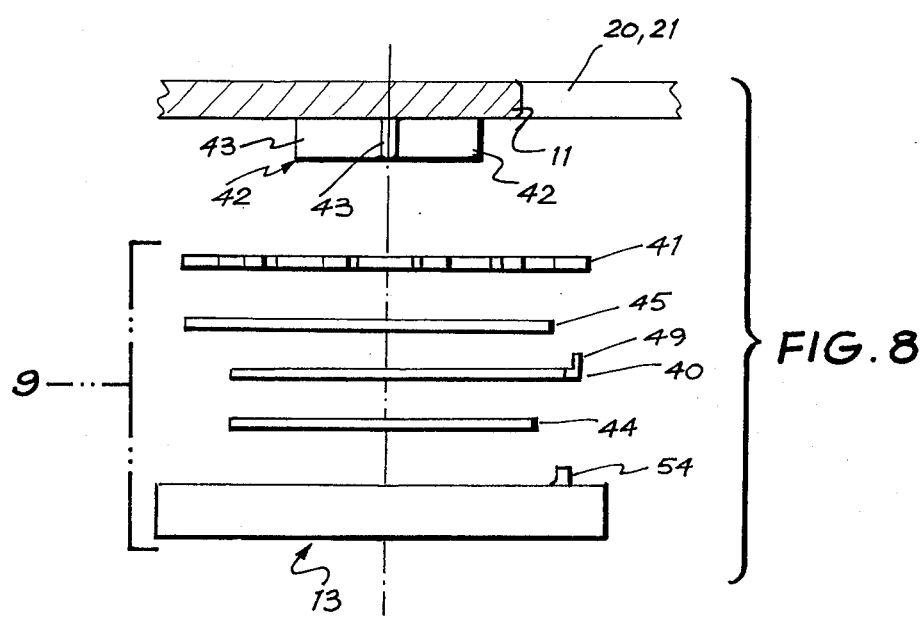
FIG. 8 shows on an enlarged scale an elevation view of a portion of the cassette which is indicated by arrow 8 in FIG. 7.
Figure 9:
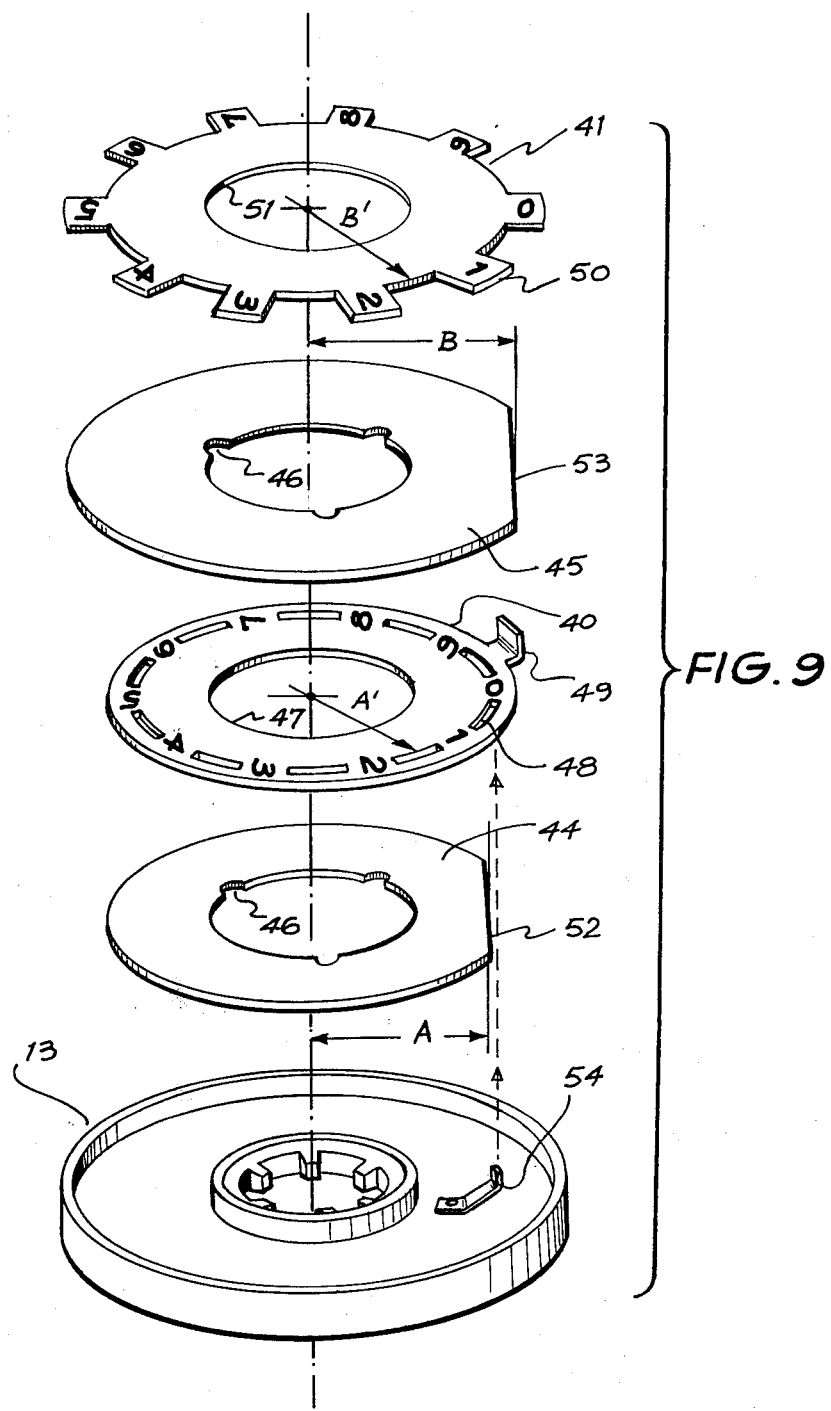
FIG. 9 shows a perspective view of the spool and indicator elements of the embodiment shown in FIG. 7, the view being taken in the direction indicated by arrow 9 in FIG. 8.

Reference is now made to FIGS. 7 to 9 of the drawings which show a second embodiment of the invention. This comprises a cassette which is similar to that which has been described above and like parts are designated by like reference numerals. However, in the second embodiment of the invention, indicator elements 40 and 41 are mounted to the casing part 11 rather than to the spool 13 as in the first described embodiment.

Thus, the inside of the casing part 11 is formed with an embossment 42 which incorporates three equispaced splines 43, and the indicator elements 40 and 41 are rotatably mounted to the embossment. Cover elements 44 and 45 are also mounted to the embossment, but the cover elements are formed with flutes 46 for engagement with the splines 43 and the cover elements are thereby prevented from rotating relative to the embossment.

As is best seen from FIG. 9 of the drawings, the lowermost indicator element 40 (i.e. the one closest to the spool 13) comprises an annular-form disc having a central aperture 47. Surrounding the aperture, adjacent the periphery of the element, is a series of ten circumferentially spaced elongate apertures 48, each of which separates successive pairs of numerals 0-1, 1-2, etc. Also, projecting outwardly and upwardly from the element 40 is a tongue 49 which is provided for driving tabs 50 which project radially from the second indicator element 41. The second indicator element 41, which is located adjacent the casing part 11 of the cassette (i.e. remote from the spool 13), also comprises an annular-form disc which has a central aperture 51. The tabs 50 project radially outwardly from the element and respective ones of the tabs carry indicia in the form of the numerals 0 to 9.

The cover element 44 is generally circular, it having a diameter which is approximately equal to the diameter of the indicator element 40, but the cover element has a flat peripheral portion 52. This flat peripheral portion is defined by a chord which is spaced a distance A from the centre of the element, the distance A being slightly less than the radial distance $A^1$ of the slots 48 in the indicator element 40. Thus, the cover element 44 underlies the slots 48 in the indicator element 40, except for those slots which do at any one time lie outside the flat edge 52 of the cover element.

The cover element 45 is also generally circular but it has a diameter approximately equal to the major diameter of the indicator element 41 and larger than the major diameter of the indicator element 40. A flat peripheral portion 53 is provided by a chord which is spaced by a distance B from the centre of the element, with the distance B being slightly less than the minor radial dimension $B^1$ of the indicator element 41. Thus, the cover element 45 underlies the tabs 50 of the indicator element 41, except for those tabs which do at any one time lie outside the flat portion 53 of the cover element 45.

An upwardly projecting leaf-spring type actuator 54 is mounted to the spool 13 and, with the orientation shown in FIG. 9, normally engages with an aligned one or other of the slots 48 in the indicator element 40. The actuator 54 is employed to advance the indicator element 40 by a portion of one revolution at the end of each complete revolution made by the spool 13.

Thus, assuming that the spool 13 is rotating and the tape 15 is being transferred to the spool 14, the operation of the mechanism shown in FIGS. 8 and 9 is as follows:

During a major portion of each revolution of the spool 13, the actuator 54 will rub against the underside of the cover element 44 and the indicator element 40 will remain stationary. However, toward the end of the first and subsequent revolutions of the spool 13, the actuator 54 will travel outside the flat edge portion 52 of the cover element 44 and temporarily will engage with one of the slots 48 in the indicator element 40. When this occurs, and until such time as the actuator 54 again moves under the cover element 44, the actuator 54 will advance the indicator element 40 by a portion of one revolution and thereby increment the indicator element by one numeral.

Similarly, as the indicator element 40 approaches the end of its first and subsequent revolutions (i.e. at the end of each ten revolutions of the spool 13) the tongue 49 on the indicator element 40 will engage with one of the tabs 50 on the indicator element 41 and thereby increment that indicator element. At other times, the tongue will be prevented from engaging with the tabs 50 by the intervening cover element 45.

In operation of the above described mechanism, a display will be obtained in respect of units and tens of revolutions of the spool 13. The display of the numerals is made through the window 21 (as in the previously described embodiment) and, to permit viewing of the numerals on the indicator element 40, the indicator element 41 and the cover element 45 are moulded from a transparent plastics material. The other elements may be moulded from an opaque or translucent material.

The lowermost cover element 44 is affixed to the embossment 42 of the associated casing part 11 and functions to hold the remaining elements in position on the embossment.

Variations and modifications may be made in respect of the above described embodiments, as illustrated in FIGS. 1 to 6 and 7 to 9 respectively, without departing from the scope of the invention as set forth in the appendant claims. Although the tape position indicates a mechanism has been described in respect of Side A only of the cassette, it will be appreciated that it might equally be applied to Side B of the cassette also, by associating the respective mechanisms with the spool 14. Alternatively, by appropriate positioning of the indicia on the respective indicator elements and by use of transparent materials for the spools and indicator elements, tape position indication may be obtained with reference to a single spool by viewing through aligned windows in both sides A and B of the cassette casing.

I claim:

1. A tape cassette comprising a casing, a pair of spools housed within the casing, a magnetic tape extending between the spools and an indicator for giving indication as to the position of the tape within the casing; said indicator comprising rotatably mounted indicia carrying means associated with and mounted adjacent to at least one of the spools, means within the casing permitting viewing of the indicia on the indicia carrying means, and drive means effecting incremental rotation of said indicia carrying means in response to a predetermined number of revolutions being made by the associated spool during transport of the tape from one of the spools to the other.

2. A tape cassette as claimed in claim 1, wherein said indicia carrying means includes two indicator elements, and said drive means includes means effecting turning of one of the indicator elements through a portion of one revolution responsive to a complete revolution being made by the associated spool and means effecting turning of the second of the indicator elements through a portion of a revolution responsive to ten complete revolutions being made by the associated spool.

3. A tape cassette as claimed in claim 1, wherein said indicia carrying means includes three indicator elements, and said drive means includes means effecting turning of a first of the indicator elements through a portion of one revolution responsive to a complete revolution being made by the associated spool, means effecting turning of the second of the indicator elements through a portion of a revolution responsive to ten complete revolutions being made by the associated spool and means effecting turning of the third of the indicator elements through a portion of one revolution responsive to one hundred complete revolutions being made by the associated spool.

4. A tape cassette as claimed in claim 2 or claim 3, wherein the indicator elements comprise annular elements, each of which is marked adjacent a peripheral margin thereof with said indicia, and said indicia being in the form of spaced-apart numerals consisting of the numbers 0 to 9.

5. A tape cassette as claimed in claim 2 or claim 3, wherein said indicator elements are of annular form and are concentrically mounted to at least one face of at least one of the spools, said drive means includes contactor means which normally engage respective ones of the indicator elements to prevent said elements from rotating with the spool, and contact breaker means for effecting cyclic disengagement between the contactor means and the respective indicator elements to permit turning of the respective indicator elements with the spool during the period of a portion of one revolution being made by the spool.

6. A tape cassette as claimed in claim 1, wherein said indicia carrying means includes two annular-form indicator elements which are mounted to the casing for rotation about a common axis aligned with the axis of the associated spool and in planes parallel to one another, said drive means includes a first actuator associated with one of the spools which engages a first one of the indicator elements and effects turning of that indicator element through a portion of one revolution responsive to a complete revolution being made by the spool, and a second actuator associated with the first indicator element which engages the second indicator element and affects turning of the second indicator element through a portion of one revolution responsive to a complete revolution being made by the first indicator element.

* * * * *